United States Patent [19]
Griffith et al.

[11] Patent Number: 4,781,863

[45] Date of Patent: Nov. 1, 1988

[54] AMINOCARNITINES

[75] Inventors: Owen W. Griffith, New York, N.Y.

[73] Assignee: Cornell Research Foundation, Inc., Ithaca, N.Y.

[21] Appl. No.: 98,934

[22] Filed: Sep. 21, 1987

Related U.S. Application Data

[62] Division of Ser. No. 596,180, Apr. 2, 1984.

[51] Int. Cl.$^4$ .................. C09F 5/00; C07C 103/18
[52] U.S. Cl. .................. 260/404.5; 260/501.13; 544/312; 560/169; 562/526; 562/561
[58] Field of Search .................. 260/404.5, 501.13; 564/198; 560/169; 544/312; 562/526, 561

[56] References Cited

PUBLICATIONS

Chemical Abstracts 49:2316c.
Birkofer, L. et al., Chem. Ber. 86, 529–534 (1953)—See C.A. 49:2316c.
Dietrich, R. F. et al., J. Org. Chem. 44, 1894–1896 (1979).
Griffith, O. W., Annual Rev. Biochem. 55, 855–878 (1986).
Rachina, V. et al., Synthesis, 967–968 (1982).

*Primary Examiner*—Richard L. Raymond
*Assistant Examiner*—Raymond Covington

[57] ABSTRACT

Acylated aminocarnitines have utility as competitive inhibitors of carnitine acyl transferases and the unacylated compounds have utility as intermediates for making the acylated compounds.

8 Claims, No Drawings

AMINOCARNITINES

This invention was made with Government support under National Institutes of Health grant numbers GM32907 and RR05396. The Government has certain rights in the invention.

This is a divisional of co-pending application Ser. No. 596,180 filed on Apr. 2, 1984 pending.

TECHNICAL FIELD

The invention is directed to novel carnitine analogues which in competition with acyl carnitines bind and inhibit carnitine acyltransferases.

BACKGROUND OF THE INVENTION

Carnitine acetyltransferase is found in mammals but its in vivo role has not been definitively established. There is conjecture, however, that it allows acetyl carnitine to buffer the pool of acetyl-Coenzyme A and/or that it may be involved in intracellular transport of acetyl and other short chain acyl groups. Compounds which competitively bind to and thus inhibit carnitine acetyltransferase are useful to investigate the in vivo role of carnitine acetyltransferase and to verify or disprove the conjecture.

Fritz, I. B. and Schultz, S. K., "Carnitine Acetyltransferase II. Inhibition by Carnitine Analogues and by Sulfhydryl Reagents", J. Biol. Chem., 240, 2188–2192 (1965) investigate the carnitine acetyltransferase inhibiting power of various carnitine analogues and other compounds. They do this by using carnitine acetyltransferase to catalyze the reaction

Acetylcarnitine + Coenzyme A ⇌ acetyl-Coenzyme A + carnitine and measuring the velocity of reaction in the presence of the tested compounds and record results in terms of $K_i'$ values where lower values indicate greater inhibiting power. The inhibitors uncovered by Fritz and Schultz are relatively weak and are subject to metabolism and thus are not suitable for the role investigation previously mentioned.

Carnitine palmitoyltransferase (CPT) has a recognized role in mammals in the following chain of reactions. Outside the mitochondria, it catalyzes the reaction

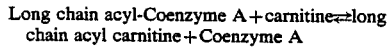
Long chain acyl-Coenzyme A + carnitine ⇌ long chain acyl carnitine + Coenzyme A The long chain acyl carnitine is carried by carnitine transporter from cytoplasm into the mitochondrial matrix. Inside the mitochondria CPT catalyzes the reaction

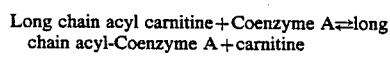
Long chain acyl carnitine + Coenzyme A ⇌ long chain acyl-Coenzyme A + carnitine Within the mitochondria, the long chain acyl-Coenzyme A is catabolized to carbon dioxide and in the case of diabetics to ketones leading to ketoacidosis.

It has been suggested by G. Tutwiler in *Carnitine Biosynthesis, Metabolism and Functions*, Academic Press, N.Y., pp. 171–173 (1980), that inhibiting the fatty acid catabolism may reverse such ketoacidosis. Compounds which competively bind to and thus inhibit CPT are useful to investigate whether interruption of fatty acid catabolism does reverse ketoacidosis and are useful in the treatment of diabetes and as a substitute or supplement for insulin.

Bromoacetyl-L-carnitine has been shown in vitro to have a potent effect against *T. Brucei*, the causitive agent of African trypanosomiases. See Gilbert, R. J., Klein, R. A., and Johnson, P., "Bromoacetyl-L-Carnitine: Biochemical and Antitrypanosomal Actions Against *Trypanosoma Brucei Brucei*", Biochem. Pharmacol. 32, No. 22, 3447–3451 (1983). The potential of bromoacetyl-L-carnitine is limited in vivo because of toxicity due to release of bromine and/or bromoacetate. A more stable analog would eliminate this toxic effect.

SUMMARY OF THE INVENTION

Acylated aminocarnitines have been discovered herein which resist metabolizing and are highly stable and strongly bind to corresponding carnitine acyltransferases and function as excellent competitive inhibitors thereof and thus provide excellent research tools for investigating the role of the transferases in the body, i.e. for evaluating the specificity of carnitine acyltransferases. The acetylated compounds are useful to investigate the role of carnitine acetyltransferase in the body, i.e. to investigate the specificity of carnitine acetyltransferase. The long chain acyl compounds are useful to investigate the role of fatty acid catabolism in diabetes and to control ketogenesis and as a supplement or substitute for insulin to control the complications of diabetes.

Haloacylated compounds herein bind in non-reversible fashion to the corresponding carnitine acyltransferases and thus are longer lasting than the unsubstituted acyl compounds. Moreover, the haloacylated compounds are stable and thus cure the deficiencies of the bromoacylated carnitines in respect to in vivo treatment of trypanosomiases.

Nonacylated aminocarnitines herein are intermediates for the acylated compounds and have the potential for binding fatty acids in mammals so that they are excreted.

Compounds herein are generally characterized as aminocarnitines and have the structural formula

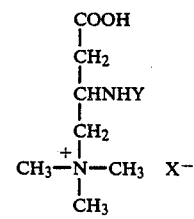

wherein Y is selected from the group consisting of —H, —H$_2^+$Z$^-$ wherein Z$^-$ is a non-toxic counterion,

wherein R is selected from the group consisting of —H and aliphatic containing from 1 to 19 carbon atoms,

wherein X' is selected from the group consisting of chlorine, bromine and iodine and R' is selected from the group consisting of —H and aliphatic containing from 1 to 18 carbon atoms and wherein $X^-$ is a non-toxic counterion.

Additional compounds herein are the non-toxic esters and salts of the acids described in the above paragraph.

Additional compounds herein are the zwitterionic compounds produced by removing H from the —COOH group whereby the —COO$^-$ serves as the counterion $X^-$ or $Z^-$.

The compounds herein include hydrates and in such $X^-$ is provided by OH$^-$ in the water of hydration.

Preferred compounds herein include 3-acetamido-4-trimethylaminobutyric acid.$H_2O$ (which may be referred to as acetyl amino carnitine and is hereinafter sometimes referred to as AAC) and 3-amino-4-trimethylaminobutyric acid.$HCl_2$ (which may be referred to as amino carnitine and is hereinafter sometimes referred to as AC).

Usually the D,L form is synthesized herein. If more potency is desired for a given weight, the L-isomer can be isolated by resolution, e.g. using alkaloid salts.

DETAILED DESCRIPTION

We turn now in more detail to the description of the amino carnitines herein.

Turning firstly to the acylated and haloacylated amino compounds herein, R and R' are selected so that the acyl chain length ranges up to 20 carbon atoms and can be saturated or unsaturated including, for example, one, two, three or even four double bonds. The acyl chains and the acyl portion of the haloacylated compounds include, for example, acetyl, propionyl, butyroyl, caproyl, capryloyl, decanoyl, tridecanoyl, lauroyl, myristoyl, myristoleoyl, palmitoyl, stearoyl, oleoyl, linoleoyl, linolenoyl, eleostearoyl, arachidoyl, gadoleoyl, and arachidonoyl.

Turning now to the counterions $X^-$ and $Z^-$ in the description of the above set forth structure, these are uncritical as long as they are non-toxic since they become separated in solution or in a mammal and can be, for example, hydroxide (such as in water of hydration), chloride, acetate, propionate, phosphate, sulfate, methosulfate, ethosulfate, bicarbonate and carbonate. As indicated above the compounds herein can be in the zwitterionic form wherein hydrogen is removed from the acid group and the resulting COO$^-$. serves as a counterion in place of $X^-$ or $Z^-$.

Turning now to the embodiment which is in the ester or salt form instead of the acid form, the particular ester group or salt cation is uncritical as long as it is non-toxic since these break down to the acid form in solution or in the body. Thus methyl or ethyl or sodium, for example, are readily substituted for hydrogen in the COOH group.

The acyl and haloacyl amino derivatives are conveniently prepared by starting with the free amino compound and acylating with acid chloride or acid anhydride for the acyl compounds and with haloacyl anhydride for the haloacyl compounds (e.g. bromoacetic anhydride for bromoacyl compounds).

Acetyl amino compound is also readily prepared by reacting 6-(chloromethyl)uracil with dimethylamine, reducing to the dihydrouracil, hydrolyzing to open the ring, acetylating, and then methylating to form the trimethylammonium salt. An alternative route to acetyl amino compound involves reducing uracil-4-acetic acid using hydrogen and rhodium on alumina, hydrolyzing with water and HCl to open the ring, acylating and cyclizing with acetic anhydride, opening the ring with ammonia, decarboxylating in a Hoffman reaction with NaOBr, and then methylating with $CH_3I$ to form the quaternary ammonium salt. A second alternative route involves starting with D- or L- aspartic acid, esterifying the $\beta$-carboxyl group with benzyl alcohol, protecting the amino group, e.g. with benzyloxycarbonyl, tert-butyloxycarbonyl or acetyl groups, forming the $\alpha$-dimethylamide using dicyclohexylcarboimide and dimethylamine, selectively reducing at the 1-position of the carbon chain with tetrabutyl ammonium borohydride, and methylating using $CH_3I$ to form the quaternary ammonium salt. This procedure yields the L- or D-carnitine isomer directly.

Free amino compound is readily formed by hydrolyzing the acetyl amino compound. Alternatively, it is prepared by starting with ethyl 4-bromocrotonate, reacting with trimethylamine to form the quaternary ammonium salt, reacting with ammonia to form amine ($NH_2$) and hydrolyzing to remove ethyl and form the acid. In the description of the above set forth structural formula the free amino compound is described both where Y is —H and where Y is —$H_2^+Z^-$.

The following specific examples are illustrative of the invention.

In the examples, temperatures are in the °C.

EXAMPLE I

D,L-3-acetamido-4-trimethylaminobutyric acid.$H_2O$, i.e. AAC, was prepared as follows:

Dimethylamine (170 ml of a 40% solution in water, 1.5 moles) and 330 ml of water were mixed by magnetic stirring in a 1 liter Erlenmeyer flask. 6-(chloromethyl)uracil (80.3 gm, 0.5 moles) was added to that mixture in portions over a 15 min. period; the reaction was slightly exothermic. The mixture was stirred until it became clear and then for an additional 30 min. The solution was then heated in a boiling water bath and filtered through a steam-heated filter to remove a small amount of insoluble impurities. The clear filtrate was rotary evaporated at reduced pressure to yield a white solid. Water (200 ml) was twice added to the solid and evaporated to completely remove unreacted dimethylamine. The solid was then suspended in 6 M HCl (500 ml) and the mixture was swirled in a boiling water bath until a clear solution resulted. That solution was rotary evaporated at reduced pressure to a dry solid and water was added and removed twice as described above. The solid was then dissolved in the minimum volume of hot water and allowed to crystallize as the solution cooled. The crystals were collected by filtration, washed with cold 50% aqueous ethanol and then ether, and dried in a vacuum desiccator over $P_2O_5$. The product, 6-(dimethylaminomethyl)uracil.HCl, was obtained as a white solid; mp 282° C.; $C_7H_{12}ClN_3O_2$ requires C: 40.88%, H: 5.88%; N: 20.43%; found C: (40.88, H: 5.66, N: 20.19).

6-(dimethylaminomethyl)uracil.HCl (10.3 gm, 0.05 moles) and 250 ml of 10% acetic acid in water were placed in a 500 ml Parr bottle. The bottle was flushed briefly with $N_2$ and then 0.5 gm of 5% rhodium on alumina catalyst powder was added. The bottle was attached to a Parr shaking hydrogenator and, after flushing twice with $H_2$, was pressurized to 40 PSI with $H_2$. Hydrogenation was carried out with shaking at room temperature for 24 hours by which time approximately 0.05 mole of $H_2$ had been absorbed. The bottle was then flushed with $N_2$, removed from the hydrogenator and the solution filtered under $N_2$ through a bed of Celite. The filtrate was rotary evaporated under reduced pressure to a white solid which was recrystallized from 50 ml of hot ethanol to which a few ml of water had been added to achieve nearly complete solubility. The crystals were collected by filtration, washed with 5% aqueous ethanol and then ether, and dried in a vacuum desiccator over $P_2O_5$. The product, 6-(dimethylaminomethyl)dihydrouracil.HCl, was obtained as a white solid (yield: 9.3 gm, 90%); mp: 257°–258° C.; $C_7H_{14}ClN_3O_2$ requires C: 40.49%; H: 6.80%; N: 20.24%; found C: 40.67%; H: 6.79%; N: 19.95%).

6-(dimethylaminomethyl)dihydrouracil.HCl (10.4 gm, 0.05 moles) was dissolved in 300 ml of 6 N HCl in a 500 ml round bottom flask. A condenser was fitted and the solution was refluxed for 30 hours using a heating mantle. The solution was then cooled and rotary evaporated to dryness at reduced pressure to yield a white solid. That material was dissolved in 10 ml of water and the resulting solution was applied to the top of a column (2.5 ×45 cm) of Dowex 50×8 (H+ form, 200–400 mesh). The column was developed using a linear gradient formed between 1 N HCl and 6 N HCl (total volume 1600 ml); the gradient was followed with 200 ml of 6 N HCl. Fractions of approximately 25 ml were collected; a 10 μl portion of every other fraction was assayed with o-phthalaldehyde to determine where compounds with primary amino groups eluted. 3-amino-4-dimethylaminobutyric acid.$HCl_2$ eluted at about 4.5M HCl and was the major o-phthalaldehyde-positive species detected. The appropriate fractions were pooled and rotary evaporated to dryness at reduced pressure. Water was added and removed twice to ensure that no free HCl remained in the product. The resulting white solid, 3-amino-4-dimethylaminobutyric acid.$HCl_2$, was pure without recrystallization (yield 9.2 gm, 84%); mp220°–221°; $C_6H_{16}Cl_2N_2O_2$ requires C: 32.89%; H: 7.36%; N: 12.79%; found C: 33.04%; H: 7.40%; N: 12.56%). 3-amino-4-dimethylaminobutyric acid.$HCl_2$ (10.96 gm, 0.05 moles) was dissolved in 300 ml of 0.5 N NaOH (the pH was 10-11)in a 500 ml Erlenmeyer flask. The solution was chilled to <5° and sodium carbonate (12.4 gm, 0.1 mole) was added. With vigorous magnetic stirring, acetic anhydride (14.8 ml; 150 mmole) was added dropwise over a 15 minute period. After stirring an additional 30 minutes at 0–5°, an aliquot was assayed with o-phthalaldehyde to confirm that no free primary amino groups remained. The mixture was then cautiously acidified to pH 2 with concentrated HCl ($CO_2$ evolution observed) and the resulting solution was rotary evaporated at reduced pressure to a gummy solid. That material was suspended in 100 ml of concentrated HCl and that mixture was filtered to remove NaCl. The filtrate was rotary evaporated under reduced pressure to yield a white amorphous solid which was not generally further purified. For purposes of characterization, the crude product was chromatographed on Dowex 50 (H+) using the procedure described for 3-amino-4-dimethylaminobutyric acid.$HCl_2$. The acetylated product, located by monitoring $A_{10}$, eluted at about 2.5 M HCl. Appropriate fractions were pooled, and rotary evaporated at reduced pressure to yield a product contaminated with NaCl. The crude material was dissolved in 25 ml of water and that solution was applied to a column (2.5×20 cm) of Dowex 50×8 (H+, 200–400 mesh). The column was washed with 1000 ml of water and the product was then eluted with 3 N $NH_4OH$. Fractions containing product were washed with $H_2O$ and rotary evaporated to dryness under reduced pressure to yield a white solid. The resulting solid, 3-acetamido-4-dimethylaminobutyric acid.$H_2O$, was pure without recrystallization (yield: 8.54 gm, 83%); mp 107°–110°; $C_8H_{16}O_3.H_2O$ requires C: 46.59%; H: 8.80%; N: 13.58%; found C: 46.96%; H: 8.86%; N: 13.85%).

3-acetamido-4-dimethylaminobutyric acid.$H_2O$(11.2 gm of unpurified material, 0.05 moles) was dissolved in 75 ml of water in a large screw cap bottle and the resulting solution was adjusted to pH 7 with 10 N NaOH. Sodium carbonate (12.4 gm, 0.1 moles), methanol (75 mls) and iodomethane (6.2 mls, 0.1 mole) were then added and the bottle was capped and stirred magnetically at 25° for 24 hours. The solution was then diluted with 250 ml of water and acidified to pH 2 with concentrated HCl. The resulting solution was rotary evaporated under reduced pressure to yield a gummy yellow solid which was suspended in 50 ml of concentrated HCl. That solution was filtered to remove NaCl, and the filtrate was rotary evaporated under reduced pressure to yield a yellow gum. The residue was dissolved in 20 ml of water and chromatographed on Dowex 50 (H+) as described for 3-amino-4-dimethylaminobutyric acid.$HCl_2$. The product, 3-acetamido-4-trimethylaminobutyric acid.$H_2O$, located by monitoring the $A_{210}$ of the fractions, was eluted at about 3 N HCl. The appropriate fractions were pooled and rotary evaporated at reduced pressure to yield a white solid contaminated with a small amount of NaCl. That material was dissolved in water and absorbed to a column (2.5×20 cm) of Dowex 50 (H+). After washing with 1000 ml of water, the product was eluted with 750 ml of 3N $NH_4OH$ and the appropriate fractions were rotary evaporated to dryness under reduced pressure. The resulting white solid, D,L-3-acetamido-4-trimethylaminobutyric acid.$H_2O$, was pure without recrystallization (yield 9.7 gm); mp 202°–202.5°, $C_9H_{18}N_2O_3.H_2O$ requires C: 49.07%; H: 9.15%; N: 12.72%; found C: 49.01%; H: 8.94%; N: 12.53%).

EXAMPLE II

D,L-3-acetamido-4-trimethylaminobutyric acid.$H_2O$, referred to hereinafter as AAC, was assayed for inhibition of carnitine acetyltransferase.

The procedure used is described in Fritz, I. B., Schultz, S. K., and Srere, P. A., "Properties of Partially Purified Carnitine Acetyltransferase", J. Biol. Chem., 238, 2509–2517 (1963).

The assay was based on the following reactions wherein CAT is used to denote carnitine acetyltransferase, CS is used to denote citrate synthase, MDH is used to denote malate dehydrogenase, NAD is used to denote β-nicotinamide adenine dinucleotide (unreduced form) and NADH is used to denote β-nicotinamide adenine dinucleotide (reduced form):

| Catalyst | Reaction |
| --- | --- |
| (1) CAT | Acetylcarnitine + Coenzyme A ⇌ carnitine + acetyl-Coenzyme A |
| (2) CS | Acetyl-Coenzyme A + oxaloacetate → citrate + Coenzyme A |
| (3) MDH | Malate + NAD ⇌ oxaloacetate + NADH + $H^+$ |

The assay is based on the fact that the velocity of reaction to produce acetyl-Coenzyme A is reduced to the extent that CAT is inhibited. Reactions (2) and (3) are a detection system for acetyl-Coenzyme A wherein acetyl-Coenzyme A, as it is produced, reacts with oxaloacetate thereby causing the MDH to catalyze production of oxaloacetate to replace that which is used and resulting in production of NADH which is detected using a spectrophotometer based on its property of absorbing light at 340 m$\mu$. Thus, when CAT is bound and inhibited, the rate of NADH production is decreased and the rate of increase of absorbency at 340 m$\mu$ is decreased. The results are readily compiled in a Lineweaver-Burk plot of the reciprocal of reaction velocity versus the reciprocal of concentration of of acetylcarnitine and the data can be analyzed to o provide $K_i'$ values as mentioned above.

Sixteen runs were carried out. They consisted of a set of 4 runs where 1 mM of D,L-acetylcarnitine (pH 8.0) was included, a set of 4 runs where 2 mM of D,L-acetylcarnitine was included, a set of 4 runs where 5 mM of D,L-acetylcarnitine was included and a set of 4 runs where 10 mM of D,L-acetylcarnitine was included. In each set of runs, one run was conducted without AAC, one run was conducted with 0.1 mM AAC, one run was conducted with 0.5 mM AAC, and one run was conducted with 1.0 mM AAC.

Each run was carried out utilizing a cuvette with 1 ml total being added to it. To each cuvette was added 0.7 ml of a premix of aqueous solutions of Tris-HCl buffer, NAD+, dithiothreitol, and Tris D,L-malate, pH of 8.0 (concentrations in the premix were as follows: Tris-HCl, 143 mM; NAD+, 0.71 mM; dithiothreitol, 4.3 mM; and Tris D,L-malate, 14.3 mM, the selected amount of D,L-acetylcarnitine as described above, 0.05 ml of a 4 mM aqueous solution of Coenzyme A, 0.025 ml of a 168 units/ml solution of CS, 0.025 ml of a 240 units/ml solution of MDH, the selected amount of AAC as described above, and water to 0.995 ml. The D,L-acetylcarnitine was added utilizing solution of concentration of 100 mM (in other words 0.010 ml for the first set of runs, 0.020 ml for the second set of runs, 0.050 ml for the third set of runs, 0.100 ml for the fourth set of runs). The AAC was added utilizing solution of concentration of 100 mM (in other words, additions for runs in each set were of 0 ml, 0.001 ml, 0.005 ml and 0.010 ml).

After the above described reactants were added, each cuvette and its contents were incubated for 15 minutes at 30° C.

Directly after the incubation period, 0.005 ml of CAT (concentration 5 units/ml) was added in each case.

The reaction rate in each case was measured as described above as a function of change in absorbance at 340 m$\mu$ (providing a time course of NADH formation) and was expressed as mole NADH/min. (1 mM NADH = 6.2 × $\Delta A_{340}$).

A Lineweaver-Burk plot was then prepared and all the lines passed through a point on the Y-axis in common with the control (no AAC) proving binding to the same site as acetyl carnitine and proving AAC is a competitive inhibitor of CAT binding it in a 1:1 molar ratio. A $K_i'$ value for the D,L form of AAC was calculated to be $5 \times 10^{-5}$M which is $10^{-2}$ to $10^{-3}$ times the $K_i'$ values found by Fritz and Schultz for the compounds they tested. The AAC was found to inhibit formation of acetyl-Coenzine A as follows: at a concentration of 0.1 mM, 34%; at a concentration of 0.5 mM, 67%; at a concentration of 1 mM, 81%. The plot indicated that AAC binds to CAT 18 times more tightly than acetylcarnitine. The binding action was found to be reversible by dilution.

EXAMPLE III

An example of the research utility of AAC is set forth below.

Four mice were injected subcutaneously with 0.5 mmol/kg carbon 14 tagged acetylcarnitine. Two of them were injected intraperitoneally with 5 mmol/kg of AAC. The carbon 14 $CO_2$ output of the mice was monitored every 15 minutes for 6 hours and for each mouse a graph was prepared with time on the X-axis and % of radiolabelled $CO_2$ on the Y-axis. The data indicated a retarded rate of radiolabelled $CO_2$ output for the mice injected with AAC indicating that AAC is active in vivo in inhibiting CAT and that CAT activity plays a major role in the catabolism of acetylcarnitine in vivo. The amount of AAC administered was not toxic to the mice.

EXAMPLE IV

3-Acetamido-4-trimethylaminobutyric acid.$H_2O$ (3.3 gm, 0.15 moles) prepared as set forth in Example I was dissolved in 90 mls of 2 N HCl and the resulting solution was refluxed for 6 hours. The solution was then cooled and rotary evaporated at reduced pressure to yield a white solid. That material was dissolved in 20 ml of water and chromatographed on Dowex 50 (H+) as described in Example I. The product (located by assay of fraction aliquots using o-phthalaldehyde) eluted at about 4 N HCl. The appropriate fractions were pooled, and rotary evaporated under reduced pressure to yield a white solid which analysis indicated to be D,L-3-amino-4-trimethylaminobutyric acid.$HCl_2$ (i.e. AC) (yield 2.7 gm, 77%); mp 214°–217°; $C_7H_{18}Cl_2N_2O_2$ requires C: 36.06%; H: 7.78%; N: 12.02%; found C: 35.99%; H: 7.79%; N: 11.87%.

The AC is readily converted to D,L-3-palmitoamido-4-trimethylaminobutyric acid.$H_2O$ (i.e. PAC) by acylating with palmitoyl chloride. The PAC readily binds to and inhibits carnitine palmitoyltransferase and is useful to investigate the role of fatty acid catabolism in diabetes. Such investigation is readily carried out, e.g. by utilizing mice with drug induced diabetes and intraperitoneally injecting some of these mice with, e.g. 0.1–50 mmol/kg of PAC and observing whether the mice treated with PAC are less ketotic than the other mice.

The AC is readily converted to D,L-3-bromoacetamido-4-trimethylaminobutyric acid.$H_2O$ by acylating with bromoacetic anhydride. The formed compound inhibits CAT similarly to AAC but the binding action is irreversible.

The term "non-toxic counterion" is used herein in its conventional sense as meaning that the counterion is non-toxic in the amounts that would be present in association with the administration of the compounds in useful amounts.

While the foregoing describes preferred embodiments, modifications within the scope of the invention will be evident to those skilled in the art. Thus, the scope of the invention is intended to be defined by the claims.

What is claimed is:

1. A process for producing D,L-3-acetamido-4-trimethylaminobutyric acid or salt form or zwitterionic form thereof comprising the steps of reacting 6-(chloromethyl)uracil with dimethylamine, reducing to the dihydrouracil, hydrolyzing to open the ring, acetylating, and then methylating.

2. A process as recited in claim 1 for producing D,L-3-acetamido-4-trimethylaminobutyric acid.H$_2$O comprising the steps of
   (a) reacting 6-(chloromethyl)uracil with dimethylamine to form crystalline derivative of 6-(dimethylaminomethyl)uracil,
   (b) dissolving the product of step (a) and reducing to form crystalline derivative of 6-(dimethylaminomethyl)-dihydrouracil,
   (c) dissolving the product step of (b) and hydrolyzing to form crystalline derivative of 3-amino-4-dimethylaminobutyric acid,
   (d) dissolving the product step (c) and acetylating to form crystalline derivative of 3-acetamido-4-dimethylaminobutyric acid,
   (e) dissolving the product of step (d) and methylating and recovering crystalline product.

3. A process for producing D,L-3-amino-4-trimethylaminobutyric acid or salt form or zwitterionic form thereof comprising the steps of reacting 6-(chloromethyl)uracil with dimethylamine, reducing to the dihydrouracil, hydrolyzing to open the ring, acetylating, methylating, then hydrolyzing.

4. A process as recited in claim 3 for producing D,L-3-amino-4-trimethylaminobutyric acid.HCl$_2$ comprising the steps of
   (a) reacting 6-(chloromethyl)uracil with dimethylamine to form crystalline derivative of 6-(dimethylaminomethyl)uracil,
   (b) dissolving the product of step (a) and reducing to form crystalline derivative of 6-(dimethylaminomethyl)dihydrouracil,
   (c) dissolving the product of step (b) and hydrolyzing to form crystalline derivative of 3-amino-4-dimethylaminobutyric acid,
   (d) dissolving the product of step (c) and acetylating to form crystalline derivative of 3-acetamido-4-dimethylaminobutyric acid,
   (e) dissolving the product of step (d) and methylating to form crystalline derivative of 3-acetamido-4-trimethylaminobutyric acid,
   (f) dissolving the product of step (e) and hydrolyzing and recovering crystalline product.

5. A process for producing D,L-3-palmitoamido-4-trimethylaminobutyric acid.H$_2$O comprising the steps of
   (a) reacting 6-(chloromethyl)uracil with dimethylamine to form crystalline derivative of 6-(dimethylaminomethyl)uracil,
   (b) dissolving the product of step (a) and reducing to form crystalline derivative of 6-(dimethylaminomethyl)dihydrouracil,
   (c) dissolving the product of step (b) and hydrolyzing to form crystalline derivative of 3-amino-4-dimethylaminobutyric acid,
   (d) dissolving the product of step (c) and acetylating to form crystalline derivative of 3-acetamido-4-dimethylaminobutyric acid,
   (e) dissolving the product of step (d) and methylating to form crystalline derivative of 3-acetamido-4-trimethylaminobutyric acid,
   (f) dissolving the product of step (e) and hydrolyzing to form crystalline derivative of D,L-3-amino-4-trimethylaminobutyric acid,
   (g) acylating with palmitoyl chloride.

6. A process as recited in claim 1 wherein the hydrolyzing to open the ring is an acid hydrolysis.

7. A process as recited in claim 3 wherein the hydrolyzing to open the ring is an acid hydrolysis.

8. A process as recited in claim 5 wherein the hydrolyzing in step (c) is an acid hydrolysis.

* * * * *